2,723,259

Patented Nov. 8, 1955

2,723,259

VINYL NAPHTHENATE POLYMER

Stewart S. Kurtz, Jr., Merion, Pa., assignor to Sun Oil Company, Philadelphia, Pa., a corporation of New Jersey No Drawing. Application January 28, 1953,
Serial No. 333,830

15 Claims. (Cl. 260—80.7)

This invention relates to polymers of vinyl esters and to methods for preparing such polymers.

According to the present invention, vinyl esters of petroleum naphthenic acids are polymerized to form polymeric materials having valuable properties. The polymers formed may be homopolymers of vinyl naphthenate, or they may be copolymers of vinyl naphthenate with other polymerizable monomers such as vinyl acetate, vinyl chloride, etc. In forming such copolymers, one or more monomers in addition to vinyl naphthenate may be employed; e. g. the two monomers, butadiene and styrene, may be polymerized with vinyl naphthenate to form a polymeric material by interaction of three polymerizable monomers, the vinyl naphthenate providing a valuable modification of the butadiene-styrene polymers. Similarly, other copolymers may be prepared as subsequently more fully described.

Vinyl naphthenate according to the invention may be prepared by reacting vinyl acetate or other lower fatty acid vinyl ester with petroleum naphthenic acids in the presence of a catalyst promoting ester interchange reaction, e. g. a catalyst comprising mineral acid and mercuric ion. Vinyl naphthenate may alternatively be prepared by passing acetylene into naphthenic acids at elevated temperature and pressure and in the presence of a catalyst such as zinc oxide.

The properties of vinyl naphthenate vary according to the properties of the naphthenic acids employed. From deoiled petroleum naphthenic acids having saponification number of 190, for example, vinyl naphthenate having boiling range of 200° C. to 225° C. at 8-9 mm. Hg. saponification number of 158.3, refractive index $n_D^{25}$ of 1.4871, and specific gravity $d_4^{20}$ of 0.9678, can be prepared.

Naphthenic acids, as originally obtained from petroleum, generally have elevated contents of unsaponifiable oil and elevated bromine numbers (A. S. T. M. 875–46T); the saponification number (mg. KOH per gram) and boiling range of such acids vary with the average molecular weight of the particular acids involved. Prior to preparation of vinyl naphthenate, the naphthenic acids may be treated for reduction of oil content, e. g. to less than 3 weight percent, by solvent extraction or other known methods. The acids may also be treated for reduction of bromine number, e. g. to less than 6, by suitable known methods, such as by contacting the acids with formaldehyde, or with a material capable of liberating formaldehyde, at an elevated temperature, e. g. 200–300° F. in the presence of a catalyst such as mineral acid and separating the acids from the resinous materials formed. The acids may also be treated for separation, e. g. by distillation, of a narrower boiling range fraction, e. g. a fraction having distillation endpoint not substantially above 510° F. at 1 mm. Hg. pressure.

Treatments as described above, may advantageously be practiced in some instances, but are not strictly necessary, particularly since, in the preparation of the vinyl naphthenate, at least some of the materials which would have been removed by such treatments are inert in the reaction and are separated from the vinyl naphthenate upon recovery of the latter, e. g. by distillation, from the reaction products.

In the treatments as described above, the saponification number of the naphthenic acids is often increased along with the other effects obtained. Preferred saponification numbers for naphthenic acids to be used in preparation of vinyl naphthenate for use according to the invention are those within the range 125–300 mg. KOH per gram, indicating average molecular weights for the acids of about 190–450.

The naphthenic acids used may be kerosene naphthenic acids, naphtha acids, gas oil acids, or lubricating oil acids, or mixtures of two or more of such types of acids, and may have been recovered from petroleum in any suitable known manner.

Vinyl naphthenate prepared as described above, is, according to the present invention, homopolymerized or copolymerized with another polymerizable unsaturated organic monomer. Suitable polymerization methods include contact of the monomer or monomers in liquid phase at elevated temperature with a polymerization catalyst; alternatively the emulsion polymerization technique may be used.

In the non-emulsion method, a preferred procedure is to maintain the charge material in liquid phase at a temperature within the approximate range from 50° C. to 300° C. in the presence of a polymerization catalyst, preferably a peroxide catalyst such as benzoyl peroxide, acetyl peroxide, cumene hydroperoxide, tertiary butyl hydroperoxide, tertiary butyl perbenzoate, potassium perborate, etc. Other known polymerization catalysts may be used. The amount of catalyst used is preferably in the range from 0.1 to 6.0 based on the amount of polymerizable monomer employed.

In the emulsion method, a preferred procedure is to use a polymerization mixture including water, vinyl naphthenate, other polymerizable monomer or monomers if any, an emulsifying agent such as potassium naphthenate, a polymerization catalyst such as cumene hydroperoxide, a catalyst activator such as the known iron-sugar complex; other known polymerization aids may be employed in addition. The polymerization may be conducted at any suitable temperature, preferably not substantially greater than 100° C.; commonly employed temperatures are −10° C., 5° C., and 50° C. When the temperature is below the freezing temperature of water, a suitable antifreeze compound such as methanol should be employed in the polymerization mixture. Various modifications of polymerization procedure are known in the art and may be employed in preparing polymeric materials according to the invention.

The catalyst used in the emulsion polymerization method is preferably of the known free-radical producing type, as exemplified by benzoyl peroxide, cumene hydroperoxide, ammonium persulfate, potassium persulfate, tertiary butyl hydroperoxide, tertiary butyl perbenzoate, etc. The emulsifying agent employed may be of any suitable type, e. g. alkali metal soaps of naphthenic acids, or of fatty acids, or of rosin acids, sulfated aliphatic alcohols, various known nonionic emulsifying agents, etc.

According to one embodiment of the invention, vinyl naphthenate prepared as described above, is homopolymerized to obtain a novel polymeric material, polyvinyl naphthenate, which is suitable for various uses such as in greases, lubricating oil compositions, as thickeners or pour point depressants, etc.

According to another embodiment of the invention, vinyl naphthenate and vinyl acetate are subjected together to polymerization conditions to obtain a novel copolymer or interpolymer composition. Such composition, for example one obtained from a polymerization mixture comprising 9 parts by weight of vinyl acetate and 1 part by weight of vinyl naphthenate, has the property of adhering strongly to glass surfaces and is useful as an interlayer for safety glass. Vinyl naphthenate-acetate copolymers are useful as molding compounds, varnish and lacquer components, etc.

According to another embodiment of the invention, vinyl naphthenate and vinyl chloride are copolymerized to form a novel copolymer having generally better milling properties and greater elasticity than that of vinyl chloride homopolymers.

In another embodiment of the invention, vinyl naphthenate, butadiene, and styrene are copolymerized to form a copolymer composition of the GR-S type having substantially superior properties with regard to resistance to cut growth than ordinary butadiene-styrene copolymers. The polymerization is preferably carried out according to the emulsion technique.

According to the present invention, vinyl naphthenate may be copolymerized with other polymerizable unsaturated organic monomers, e. g. vinyl monomers, vinylidene halides, allyl monomers, olefins, e. g. ethylene, propylene, etc., unsaturated dicarboxylic acid esters or anhydrides, etc. Suitable vinyl monomers for copolymerization with vinyl naphthenate include vinyl halides; vinyl esters of monocarboxylic organic acids, e. g. vinyl acetate, vinyl esters of higher fatty acids, vinyl benzoate, etc.; vinyl esters of polycarboxylic organic acids, e. g. vinyl succinate, vinyl phthalate, etc.; acrylonitrile; styrene; etc. Suitable allyl monomers include allyl esters of fatty or aromatic monocarboxylic acids, allyl esters of polycarboxylic acids, etc. Suitable unsaturated dicarboxylic acid derivatives include maleic anhydride, glycol maleate, fumaric anhydride, etc.

Other copolymers included within the scope of the invention are copolymers of vinyl naphthenate with butadiene or a derivative thereof, such as isoprene, methyl isoprene, chloroprene, etc., with or without other materials such as styrene and acrylonitrile entering into the polymerization reaction.

The following examples illustrate the invention:

Vinyl naphthenate was prepared in the following manner: In a 500 ml. round-bottom three-neck flask provided with a reflux condenser and a gas inlet tube for use of a stream of nitrogen, were placed 206 grams (2.4 moles) of freshly distilled vinyl acetate and 118 grams (0.4 mole) of naphthenic acids (Sap. No. 190). The naphthenic acids and vinyl acetate were completely miscible. Mercuric acetate (1.6 grams) was added and the mixture stirred with a mechanical stirrer for 30 minutes at room temperature before adding 0.15 ml. of 100% sulfuric acid. The solution was heated under reflux for 3 hours. Sodium acetate trihydrate (0.83 gram) was added to neutralize the sulfuric acid. Excess vinyl acetate was recovered by distillation at atmospheric pressure until the pot temperature was 125° C. The pressure was then reduced to 3.8 mm. Hg. pressure and the distillation continued. The major fraction (167.1 grams) distilled at 200–225° C. at 8–9 mm. Hg. pressure and had an acid number of 25 and a saponification number of 153. Naphthenic acids were removed from the vinyl naphthenate by diluting with an equal volume of pentane, adding the theoretical amount of aqueous sodium hydroxide and extracting with 160 ml. of 30% isopropanol. After removal of the pentane the vinyl naphthenate fraction weighed 138.6 grams. Upon redistillation the purified vinyl naphthenate fraction weighed 127.2 grams and had saponification number 158.3, acid number 0, refractive index $n_D^{25}$ of 1.4871, specific gravity $d_4^{20}$ of 0.96780.

Vinyl naphthenate was polymerized, and copolymerized with vinyl acetate at 95–100° C. by the addition of 1% benzoyl peroxide. The change in refractive index $n_D^{25}$ and intrinsic viscosity (N) calculated in the manner described in J. Am. Chem. Soc., volume 73, page 839 (1951), was followed by removing and testing samples at various intervals. The polymerization and copolymerization of vinyl esters is accompanied by an increase in refractive index and intrinsic viscosity.

The table shows the results of the polymerizations, all of which were conducted at 95–100° C. with the exception of Run 5 where the temperature was 65° C. In order to increase the degree of polymerization 1% additional catalyst was added after 24 hours to the monomer-polymer mixture in Run 1. Also, in Run 2, 1% additional catalyst was added after 2 hours.

Polymerized vinyl naphthenate is a very viscous oil with a light yellow color. Sample 5 prepared from 9 parts vinyl acetate and 1 part vinyl naphthenate is a clear almost colorless, rubbery solid that adheres strongly to glass surfaces, and is useful as an interlayer for safety glass.

| Run No. | Charge | Time | Refractive Index | Intrinsic Viscosity |
|---|---|---|---|---|
| 1 | 10 grams vinyl napthenate, 0 grams vinyl acetate, 1 wt. percent benzoyl peroxide. | 0<br>2<br>7<br>23<br>24<br>26<br>31 | 1.4781<br>1.4945<br>1.4948<br>1.4949<br>1.4959<br>1.5033<br>1.5061 | 0.0897<br>0.0213<br>0.0219<br>0.0262<br>0.0242<br>0.0609<br>0.0625 |
| 2 | 9.3 grams vinyl napthenate, 3.1 grams vinyl acetate, 1 wt. percent benzoyl peroxide. | 0<br>2<br>3 | 1.4685<br>1.4893<br>------ | 0.0085<br>0.0732<br>0.1366 |
| 3 | 5.0 grams vinyl napthenate, 5.0 grams vinyl acetate, 1 wt. percent benzoyl peroxide. | 0<br>2 | 1.4478<br>1.4813 | 0.000<br>0.1080 |
| 4 | 2.5 grams vinyl napthenate, 7.5 grams vinyl acetate, 1 wt. percent benzoyl peroxide. | 1<br>2 | 1.4275<br>------ | 0.000<br>0.2020 |
| 5 | 1 gram vinyl napthenate, 9.0 grams vinyl acetate, 1 wt. percent benzoyl peroxide. | 0<br>3 | 1.4051<br>------ | ------<br>0.570 |

In the preceding example, copolymerizations of vinyl naphthenate and vinyl acetate were carried out with various different percents of vinyl naphthenate in the original naphthenate-acetate mixture. Preferably, the percent of vinyl naphthenate is within the range from 5 to 80. In the preparation of copolymers having optimum properties for use as safety glass interlayers, the percent of vinyl naphthenate is preferably in the range from 5 to 15.

The invention claimed is:

1. As a new composition of matter, vinyl naphthenate polymer.

2. Method for polymerizing vinyl naphthenate which comprises: heating vinyl naphthenate in liquid phase at a temperature of 50° C. to 300° C. in the presence of a polymerization catalyst.

3. Method according to claim 2 wherein said catalyst is benzoyl peroxide.

4. As a new composition of matter, vinyl naphthenate copolymerized with another polymerizable organic compound having nonaromatic carbon-to-carbon unsaturation.

5. As a new composition of matter, vinyl naphthenate copolymer with another vinyl ester of a monocarboxylic organic acid.

6. As a new composition of matter, vinyl naphthenate-vinyl acetate copolymer.

7. Composition according to claim 6 wherein the weight percent of vinyl naphthenate in the mixture of polymerizable monomers from which said copolymer is prepared is within the range from 5 to 80.

8. Composition according to claim 7 wherein said weight percent is within the range from 5 to 15.

9. As a new composition of matter, vinyl naphthenate-vinyl chloride copolymer.

10. As a new composition of matter, butadiene-styrene-vinyl naphthenate copolymer.

11. Composition according to claim 10 wherein the weight percent of vinyl naphthenate in the mixture of polymerizable monomers from which said copolymer is prepared is within the range from 0.1 to 20.

12. Composition according to claim 11 wherein said weight percent is within the range from 0.5 to 2.0.

13. Method for polymerizing vinyl naphthenate which comprises: forming an emulsion of vinyl naphthenate in an aqueous medium containing an emulsifying agent and heating the emulsion in the presence of a free-radical producing catalyst at a temperature not substantially greater than 100° C.

14. Method for preparing butadiene-styrene copolymers having improved properties which comprises: forming an emulsion of butadiene, styrene, and vinyl naphthenate in an aqueous medium containing an emulsifying agent and heating the emulsion in the presence of a free-radical producing catalyst at a temperature not substantially greater than 100° C.

15. As a new composition of matter, a copolymer obtained by polymerizing 5–80 parts by weight of vinyl naphthenate with 20–95 parts by weight of other polymerizable organic material having nonaromatic carbon-to-carbon unsaturation.

References Cited in the file of this patent

UNITED STATES PATENTS 2,482,606  Adelson et al. _____ Sept. 20, 1949